(12) United States Patent
Materne et al.

(10) Patent No.: US 6,894,103 B2
(45) Date of Patent: *May 17, 2005

(54) ELECTROPOLYMERIZATION MODIFIED CARBON BLACK AND ARTICLES INCLUDING TIRES HAVING AT LEAST ONE COMPONENT CONTAINING SUCH MODIFIED CARBON BLACK

(75) Inventors: Thierry Florent Edme Materne, Viville (BE); Giorgio Agostini, Colmar-Berg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 215 days.

This patent is subject to a terminal disclaimer.

(21) Appl. No.: 10/301,905

(22) Filed: Nov. 22, 2002

(65) Prior Publication Data

US 2003/0073775 A1 Apr. 17, 2003

Related U.S. Application Data

(62) Division of application No. 09/667,109, filed on Sep. 21, 2000, now Pat. No. 6,512,040.

(51) Int. Cl.$^7$ ................................................ C08L 3/04
(52) U.S. Cl. ................... 524/495; 524/492; 524/575; 524/576; 524/577; 525/331.9; 525/333.1; 152/209.1
(58) Field of Search ........................ 524/495; 525/331.9

(56) References Cited

U.S. PATENT DOCUMENTS

| | | | |
|---|---|---|---|
| 5,202,387 A | 4/1993 | Halasa et al. | ............... 525/316 |
| 6,325,911 B1 | 12/2001 | Mertens et al. | ............. 205/159 |
| 6,375,821 B1 * | 4/2002 | Jerome et al. | ................ 205/83 |

FOREIGN PATENT DOCUMENTS

| | | | |
|---|---|---|---|
| EP | 1010718 | 11/1999 | ............ C08J/3/215 |
| EP | 1191072 | 3/2002 | ............. C09C/1/56 |
| WO | 9902614 | 1/1999 | ............ C09D/5/44 |
| WO | 9920697 | 4/1999 | ............ C09D/5/44 |

OTHER PUBLICATIONS

EPO Search Report.

* cited by examiner

*Primary Examiner*—David W. Wu
*Assistant Examiner*—Rip A. Lee
(74) *Attorney, Agent, or Firm*—Henry C. Young, Jr.

(57) ABSTRACT

This invention relates to a carbon black modified by a two step process in which carbon black is initially treated with functional monomers by an electropolymerization process to form a functionalized carbon black having an initial polymer attached to, of grafted to, the carbon black following which (A) at least one diene monomer, or (B) living anionic catalysis prepared polymer, is introduced to the functionalized carbon black to continue the polymerization, starting from a living end of the initially formed polymer, and thereby form an extended diene-based polymer. By the addition of the diene monomer or the live anionic polymer to form the associated extended diene-based polymer, it is contemplated that the modified carbon black is rendered more compatible with diene-based elastomers. Such modified carbon black may be used, for example, as reinforcement for component(s) of various articles of manufacture, including tires. Accordingly, an article of manufacture is provided, such as for example a tire, having at least one component of a rubber composition which contains such modified carbon black.

12 Claims, No Drawings

ELECTROPOLYMERIZATION MODIFIED
CARBON BLACK AND ARTICLES
INCLUDING TIRES HAVING AT LEAST ONE
COMPONENT CONTAINING SUCH
MODIFIED CARBON BLACK

This is a Divisional of parent application Ser. No. 09/667,109 filed on Sep. 21, 2000 now U.S. Pat. No. 6,512,040.

FIELD OF THE INVENTION

This invention relates to a carbon black modified by a two step process in which carbon black is initially treated with functional monomers by an electropolymerization process to form a functionalized carbon black having an initial polymer attached to, of grafted to, the carbon black following which (A) at least one diene monomer, or (B) living anionic catalysis prepared polymer, is introduced to the functionalized carbon black to continue the polymerization, starting from a living end of the initially formed polymer, and thereby form an extended diene-based polymer. By the addition of the diene monomer or the live anionic polymer to form the associated extended diene-based polymer, it is contemplated that the modified carbon black is rendered more compatible with diene-based elastomers. Such modified carbon black may be used, for example, as reinforcement for component(s) of various articles of manufacture, including tires. Accordingly, an article of manufacture is provided, such as for example a tire, having at least one component of a rubber composition which contains such modified carbon black.

BACKGROUND OF THE INVENTION

Preparation of a modified carbon black by an electropolymerization process may be accomplished, for example, by providing a suspension of carbon black particles and/or carbon black fibers in a suitable solvent and causing electropolymerization of functional monomers onto the surface of such carbon black.

Exemplary of such process is seen in WO 99/02614 and WO 99/20697 patent publications.

However, it is contemplated herein that, where it is intended that such modified carbon blacks be used to reinforce various diene-based elastomers, such carbon blacks can be further modified to enhanced their usefulness for blending with diene-based elastomers.

In the description of this invention, the term "phr" where used herein, and according to conventional practice, refers to "parts of a respective material per 100 parts by weight of rubber, or elastomer".

The terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, an electropolymerization surface modified carbon black is prepared by a method which comprises the steps of treating carbon black particles and/or carbon black fibers by:

(A) Forming a functional polymer by electropolymerization onto the surface of carton black selected from at least one of carbon black particles and carbon black fibers by treating a dispersion of said carbon black particles and/or carbon black fibers in a combination of a monomer and solvent by introducing a negatively charged cathode and a positively charged anode individually to said dispersion with an electrical potential said cathode and anode to cause an electropolymerization of said monomer to form a living polymer (ionic or radicalar) on the surface of said carbon black particles and/or fibers, wherein said monomer and solvent combination is selected from;

(1) combination of monomer "X" and solvent selected from acrylic and methacrylic solvents, or (2) monomer "Y" and aprotic solvent, followed by (B) introducing at least one polymerizable monomer to the living ends of said functional polymer formed on the surface of said carbon black particles and/or carbon black fibers of step (A) in said solvent solution and polymerizing said polymerizable monomer thereon in the presence of an anionic catalyst, and preferably in the presence of an anionic polymerization randomizing modifier, to form an elastomeric extension to said functional polymer carbon black particles and/or functionalized carbon black fibers, or (C) quenching a living, anionic catalysis organic solution prepared elastomer by introducing said functionalized carbon black particles and/or functionalized carbon black fibers of said step (A) to said living elastomer, wherein said living elastomer is prepared by polymerizing at least one polymerizable monomer in the presence of an anionic catalyst, and preferably in the presence of an anionic catalyst modifier, to thereby form an elastomeric extension to said functionalized carbon black particles and/or said functionalized carbon black fibers, and (D) recovering said treated carbon black particles and/or carbon black fibers;

wherein said solvent for said electropolymerization contains an electrolyte for providing a suitable electrical conductivity for the organic solvent solution for the electric current to effectively flow between said anode and said cathode;

wherein said polymerizable monomers for said step (B) and step (C) are selected from at least one of (1) isoprene and 1,3-butadiene, and (2) a combination of at least one of isoprene and 1,3-butadiene together with at least one of styrene and alphamethyl styrene, preferably styrene;

wherein said anionic catalysis prepared elastomer is preferably selected from cis 1,4-polybutadiene, cis 1,4-polyisoprene, isoprene/butadiene copolymer and styrene/isoprene/butadiene terpolymer, wherein said combination of monomer "X" and solvent is a combination selected from acrylonitrile/acetonitrile, acrylonitrile/propylene carbonate, acrylonitrile/dimethylformamide, acrylonitrile/dithmethacrylamide, acrylonitrile/pyridine, ethylacrylate/dimethylformamide, acrylonitrile/dimethacrylamide, ethylacrylate/pyridine, silyated-2-hydroxyethylmethacrylate/dimethylformamide, methylmethacrylate/dimethylformamide, glycidylmethacyrlate/dimethylformamide, n-butylacrylate/dimethylformamide, ter-butylacrylate/dimethylformamide, allylmethacrylate/dimethylformamide, pyrrole/dimethylformamide, thiophene/dimethylformamide and vinylpiridine/dimethylformamide; and wherein said combination of monomer "Y" and solvent is a combination selected from acrylonitrile/acetonitrile, acrylonitrile/dimethylacetamide, acrylonitrile/N,N'-dimethylformamide, acrylonitrile/pyridine, ethylacrylate/N,N'dimethylformamide, ethylacrylate/pyridine, trimethylsiloxyethylmethacrylate/N,N'dimethylformamide, methylmethacrylate/N,N'dimethylformamide, ter-butylacrylate/N,N'dimethyhlformamide, glycidylmethacrylate/N,N'dimethyhlformamide, n-butylacrylate/N,N'dimethylformamide, allylmethacrylate/N,N'dimethylformamide, pyrrole/dimethylformamide, thiophene/dimethylformamide and vinylpiridine/dimethylformamide.

It is to be appreciated that, for said electropolymerization of monomers onto the surface of said carbon black particles and/or carbon black fibers, the electrolysis bath also typically contain an electrolyte for a purpose of providing a suitable electrical conductivity for the organic solvent solution to enable the electric current to effectively flow from one electrode to the other and to cause the electrochemical reaction to proceed (electrical current flow between the aforesaid anode and cathode, as the case may be). A typical example of an electrolyte is tetraethyl ammonium perchlorate.

In practice, said anionic catalysis prepared elastomers can be prepared by polymerizing said polymerizable monomer(s) in an organic solvent in the presence of an anionic catalyst such as, for example, a butyl lithium catalyst, for which an anionic polymerization modifier is used for randomizing the prepared elastomer such as, for example, tetramethylene diamine (TMEDA) which is understood to be a typical modifier, for example, for butyl lithium catalysis of 1,3-butadiene to from a relatively randomized cis 1,4-polybutadiene.

Significant aspects of two step procedure for the invention is that in addition to (A) first forming a functionalized carbon black by forming what is considered herein to be a significant covalent linkage between an electropolymerization formed first polymer and the carbon black particles and/or carbon black fibers, followed by (B) forming an extended polymer thereon of an elastomer by (1) a continued anionic polymerization of introduced polymerizable monomer(s) to provide a composite thereof with enhanced compatibility with diene based elastomers for which the treated carbon black can provide reinforcement, or b) a quenching of polymerizate of an elastomer of anionic catalyzed monomers of at least one of 1,3-butadiene, isoprene, optionally with styrene in a form of at least one living elastomer, preferably as cis 1,4-polybutadiene, cis 1,4-polyisoprene, isoprene/butadiene copolymers and styrene/isoprene/butadiene terpolymers to form a composite of said functionalized carbon black (functionalized carbon black particles and/or functionalized carbon black fibers) and elastomer. Such elastomer extended functionalized carbon black composite is envisioned herein as having an enhanced compatibility with, and thereby enhanced reinforcement of, diene-based elastomers when blended therewith.

Use of the treated bond carbon black of this invention, with the aforesaid covalent linkage between carbon black and elastomer and associated improved carbon black and elastomer interaction, for reinforcement of various rubber compositions, is considered herein to be particularly beneficial for enhancement of various physical properties of various rubber composition as compared to use of untreated carbon black. For example, such reinforcement is contemplated to be particularly beneficial for various tire components such as, a tire tread, including one or more of reduced tire tread wear and/or reduced rolling resistance for a tire tread.

It is to be appreciated that an electrical current resulting from the electrical potential between the cathode and anode causes a the electropolymerization to proceed. While in practice a direct current (DC) may be preferred, it is considered that, where appropriate, an alternate current (AC) might be used.

In additional accordance with this invention, an electropolymerization modified carbon black is provided by the method of this invention.

In further accordance with this invention, an electropolymerization modified carbon black-containing rubber composition is provided which comprises, based upon parts by weight of an ingredient per 100 parts by weight of elastomer (phr);

(A) 100 phr of at least one diene-based elastomer (B) about 20 to about 150, alternately about 35 to about 115, phr of at least one reinforcing particulate filler as:

(1) about 20 to about 100, alternately about 30 to about 80, phr of said electropolymerization modified carbon black, (2) from zero to about 50, alternately about 5 to about 35, phr of at least one additional particulate reinforcing material selected from carbon black, synthetic amorphous silica, starch/plasticizer composite, and silica treated carbon black having silica domains on its surface wherein said silica and silica of said silica treated carbon black contain hydroxyl groups (e.g. silanol groups) in its surface, and (C) a coupling agent for said silica and silica treated carbon black, as the case may be, wherein said coupling agent contains a moiety reactive with said hydroxyl groups on the surface of said silica and silica treated carbon black, as the case may be, and another moiety interactive with at least one of said elastomer(s).

In further accordance with this invention, an article of manufacture is provided having at least one component comprised of (A) a rubber composition which contains said electropolymerization modified carbon black or (B) said electropolymerization modified carbon black-containing rubber composition.

In additional accordance with this invention, a tire is provided having at least one component comprised of (A) a rubber composition which contains said electropolymerization modified carbon black or (B) said electropolymerization modified carbon black-containing rubber composition.

In further accordance with this invention, a tire is provided having a circumferential tread comprised of (A) a rubber composition which contains said electropolymerization modified carbon black or (B) said electropolymerization modified carbon black-containing rubber composition.

Preferably, the said diene based elastomer is a homopolymer or copolymer of a conjugated diene such as, for example, isoprene and/or 1,3-butadiene or copolymer of at least one conjugated diene, such as for example isoprene and/or 1,3-butadiene, and a vinyl aromatic hydrocarbon such as, for example, styrene and alpha methyl styrene, preferably styrene.

Said elastomer may also include one or more organic solvent solution polymerization prepared elastomers of isoprene/butadiene copolymers, styrene/butadiene copolymers and styrene/isoprene/butadiene copolymers which are end functionalized with minor amounts of, for example, trialkoxysilane, dialkoxymonoalkyl silane, or primary or secondary amines such as, for example, gamma aminopropyltrialkoxy silane, ethanolamine or ethanol(methyl) amine. Such functionalizing of such elastomers is well known to those having skill in such art.

Tin coupled and/or tin end capped organic solvent solution derived elastomers of, for example styrene/butadiene, styrene/isoprene/butadiene and isoprene/butadiene copolymers may also be utilized which have been prepared, for example, by the polymerization of styrene, 1,3-butadiene and optionally isoprene monomers in an organic solvent solution in the presence of an alkyl lithium catalyst and organotin compound as is also well known to those having skill in such art.

Functionalized aqueous polymerization prepared styrene/butadiene copolymer elastomers (E-SBR) may also be used. Such elastomers may be prepared by, for example, copolymerizing the styrene and 1,3-butadiene with minor amounts of, for example, hydroxypropylmethacrylate (HPMA), acrylonitrile (ACN) or vinylpyridine. Such functionalizing of an E-SBR is well known to those having skill in such art.

As a further practice of this invention significantly, a coupling agent, may be used having a moiety, preferably having a silane moiety, which is capable of reacting with at least one of said moieties on the surface of said modified carbon black and, also with silanol groups on said silica surface. If desired the silica, particularly precipitated silica aggregates, may be pre-treated (pre-reacted) with such coupling agent prior to its addition to the rubber composition.

Reinforcing carbon blacks and carbon blacks for preparation of the electropolymerization modified carbon blacks contemplated for use in this invention are carbon blacks typically suitable for reinforcing elastomers such as, for example, carbon blacks having an Iodine value in a range of about 40 to about 160 g/kg, a DBP (dibutylphthalate) value in a range of about 80 to about 180 cm$^3$/100 g and the nitrogen absorption number (BET) in the range of about 50 to about 200 m$^2$/g. Reference may be made to *The Vanderbilt Rubber Handbook* (1990), Pages 416 through 418 for general descriptions of such carbon blacks. Representative of such carbon blacks are, for example and not intended to be limiting, are carbon blacks with ASTM designations of N110, N121, N234, N330, and N660.

While in the practice of this invention various coupling agents can be used, a typical coupling agent may be, for example, a bis-(trialkoxysilylalkyl) polysulfide containing sulfur atoms in range of from about 2 to about 6 or even up to about 8 sulfur atoms, with an average of from 2 to 2.6 or from 3.5 to 4 sulfur atoms in its polysulfidic bridge. For example, the silica coupler can be bis-(3-triethoxy silylpropyl) polysulfide, including the disulfide and tetrasulfide versions thereof.

Conventionally a weight ratio of coupling agent to the said silica and silica treated carbon black, if used, may, for example, be in a range of about 0.01/1 to about 0.25/1.

The rubber composition itself can also be provided as being a sulfur cured composition through vulcanization of the uncured elastomer composition. The sulfur curing is accomplished in a conventional manner, namely, by curing under conditions of elevated temperature and pressure for a suitable period of time.

The curatives for sulfur curing the rubber composition are curatives conventionally used for sulfur curable elastomers which typically include sulfur and one or more appropriate cure accelerators and sometimes also a retarder. Such curatives and use thereof for sulfur curable elastomer compositions are well known to those skilled in the art.

Sequential mixing processes for preparing sulfur curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

In the practice of this invention, as hereinbefore pointed out, the rubber composition may be comprised of at least one diene-based elastomer, or rubber. Such elastomers may be selected, for example and not intended to be limiting, from at least one of cis 1,4-polyisoprene rubber (natural and/or synthetic, and preferably natural rubber), styrene/butadiene copolymer rubbers whether prepared by aqueous emulsion of organic solvent solution polymerization of styrene and 1,3-butadiene, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber, high vinyl polybutadiene rubber having a vinyl 1,2-content in a range of from about 35 to about 90 percent, and a minor amount, if used, of 3,4-polyisoprene rubber.

In one aspect, particularly for a tire tread, the rubber might be of at least two of diene based rubbers. For example, a combination of two or more rubbers is preferred such as cis 1,4-polyisoprene rubber (natural or synthetic, although natural is preferred), styrene/isoprene/butadiene rubber, emulsion and/or solution polymerization derived styrene/butadiene rubber, cis 1,4-polybutadiene rubbers, emulsion polymerization prepared butadiene/acrylonitrile copolymer and a minor amount of 3,4-polyisoprene rubber.

The silica treated carbon black may be prepared, for example, by reacting an alkoxysilane with carbon black or by co-fuming carbon black and silica at an elevated temperature. The synthetic amorphous silica is preferably in a form of precipitated silica aggregates.

While the commonly employed synthetic siliceous pigments used in rubber compounding applications can be used as the silica in this invention, including pyrogenic and precipitated siliceous pigments, including aluminosilicates, precipitated silicas are usually preferred and the term "precipitated silica" as used herein is intended to include aluminosilicates formed by co-precipitation of silicates and aluminates.

The precipitated silica are typically obtained by the acidification of a soluble silicate, e.g., sodium silicate, generally exclusive of silica gels in which a suitable electrolyte is included.

Such silicas might be characterized, for example, by having a BET surface area, as measured using nitrogen gas, preferably in the range of about 40 to about 600, and more usually in a range of about 50 to about 300 square meters per gram (m$^2$/g). The BET method of measuring surface area is described in the *Journal of the American Chemical Society*, Volume 60, Page 304 (1930).

The silica may also be typically characterized by having a dibutylphthalate (DBP) absorption value in a range of about 100 to about 400, and more usually about 150 to about 300 cc/100 gm.

Various commercially available precipitated silicas, namely silica aggregates which may be supplied in an agglomerated from of the aggregates, may be considered for use in this invention such as, and only for example herein, silicas commercially available from PPG Industries under the Hi-Sil trademark with designations 210, 243, etc; silicas available from Rhodia with, for example, designations of Zeosil 1165MP and Zeosil 165GR and silicas available from Degussa AG with, for example, designations VN2 and VN3, BV3380GR, etc. and from JM Huber as Zeopol 8745.

The starch/plasticizer composite for use in this invention is a composite of starch and plasticizer.

The starch is typically composed of amylose units and amylopectin units in a ratio of about 5/95 to about 35/65, for example and alternatively about 15/75 to about 30/70, and has a softening point according to ASTM No. D1228 in a range of about 180° C. to about 220° C.; whereas the starch/plasticizer composite has a softening point in a range of about 110° C. to about 170° C. according to ASTM No. D1228.

For the starch/plasticizer composite, starch to plasticizer weight ratio may be, for example, in a range of about 0.5/1 to about 4/1, alternatively about 1/1 to about 2/1, so long as the starch/plasticizer composition has the required softening point range, and preferably, is capable of being a free flowing, dry powder or extruded pellets, before it is mixed with the elastomer(s).

In practice, it is desired that the synthetic plasticizer itself is compatible with the starch, and has a softening point lower than the softening point of the starch so that it causes the softening of the blend of the plasticizer and the starch to be lower than that of the starch alone. This phenomenon of blends of compatible polymers of differing softening points having a softening point lower than the highest softening point of the individual polymer(s) in the blend is well known to those having skill in such art.

For the purposes of this invention, the plasticizer effect for the starch/plasticizer composite, (meaning a softening point of the composite being lower than the softening point of the starch), can be obtained through use of a polymeric plasticizer such as, for example, poly(ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more copolymers and hydrolyzed copolymers thereof selected from ethylene-vinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated, hydrolysed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate.

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known those skilled in such art.

For example, vinylalcohol/ethylene (60/40 mole ratio) copolymers can conventionally be obtained in powder and in pellet forms at different molecular weights and crystallinities such as, for example, a molecular weight of about 11,700 with an average particle size of about 11.5 microns or a molecular weight (weight average) of about 60,000 with an average particle diameter of less than 50 microns.

Various blends of starch and ethylenevinyl alcohol copolymers can then be prepared according to mixing procedures well known to those having skill in such art. For example, a procedure might be utilized according to a recitation in the patent publication by Bastioli, Bellotti and Del Trediu entitled "A Polymer Composition Including Destructured Starch An Ethylene Copolymer", U.S. Pat. No. 5,403,374.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an "esterification condensation reaction". Such esterification reactions are well known to those skilled in such art.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas as discussed herein, and plasticizers, fillers, pigments, fatty acid, zinc oxide, waxes, antioxidants and antiozonants, peptizing agents and reinforcing materials such as, for example, carbon black as discussed herein. As known to those skilled in the art, depending on the intended use of the sulfur vulcanizable and sulfur vulcanized material (rubbers), the additives mentioned above are selected and commonly used in conventional amounts.

It is to be appreciated that the silica coupler and/or the silica silylating agent, if in a liquid form, may be used in conjunction with a carbon black carrier, namely, pre-mixed with a carbon black prior to the addition to the rubber composition, and such carbon black is to be included in the aforesaid amount of carbon black accounted for in the rubber composition formulation.

Typical amounts of tackifier resins, if used, may be, for example, about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 3 phr.

Often stearic acid is used in a relatively impure state and is commonly referred to in the rubber compounding practice as "stearic acid" and is so referred to in the description and practice of this invention.

Typical amounts of zinc oxide comprise about 2 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either-accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of the prescribed modified carbon black in a silica reinforced rubber composition.

The presence and relative amounts of the additives, as hereinbefore described, are not considered to be an aspect of the present invention which is more primarily directed to the utilization of the prescribed electropolymerization modified carbon black unless otherwise indicated.

The ingredients are typically mixed in at least two stages, namely, at least one non-productive stage followed by a productive mix stage. The final curative are typically mixed in the final stage which is conventionally called the "productive" mix stage in which the mixing typically occurs at a temperature, or ultimate temperature, lower than the mix temperature(s) than the preceding non-productive mix stage(s). Usually internal rubber mixers are used. The rubber, modified carbon black, as well as other reinforcing pigments if used, are typically mixed in one or more non-productive mix stage. The terms "non-productive" and "productive" mix stages are well known to those having skill in the rubber mixing art.

Usually the ingredients are thermomechanically mixed in one or more non-productive mixing (NP) mixing stages where the mixing temperature is allowed to reach a temperature between about 140° C. and about 190° C.

Thereafter, sulfur and vulcanization accelerator(s) are blended therewith in a productive mixing stage, also usually in an internal rubber mixer, to a temperature in a range of about 100° C. to about 120° C.

The rubber composition of this invention can be used for various purposes. For example, as hereinbefore discussed, it can be used for various tire compounds. Such tires can be built, shaped, molded and cured by various methods which are known and will be readily apparent to those having skill in such art.

While various embodiments are disclosed herein for practicing the invention, it will be apparent to those skilled in this art that various changes and modifications may be made therein without departing from the spirit or scope of the invention.

What is claimed is:

1. An electropolymerization modified carbon black-containing rubber composition which comprises,
   (A) 100 phr of at least one diene-based elastomer
   (B) about 20 to about 150 phr based on 100 parts by weight (phr) of elastomer of at least one reinforcing particulate filler as:
      (1) about 20 to about 100 phr of electropolymerization modified carbon black,
      (2) from zero to about 50 phr of at least one additional particulate reinforcing material selected from carbon black, synthetic amorphous silica and silica treated carbon black having silica domains on its surface and starch/plasticizer composite, wherein said synthetic amorphous silica, silica of said silica treated carbon black and said starch/plasticizer composite contain hydroxyl groups on its surface, and
   (C) a coupling agent for said synthetic amorphous silica, silica treated carbon black and starch/plasticizer composite, wherein said coupling agent contains a moiety reactive with said hydroxyl groups on the surface of said synthetic amorphous silica, silica treated carbon black, and starch/plasticizer and another moiety interactive with at least one of said elastomer(s);
   wherein said electropolymerization modified carbon black is prepared by the steps of treating carbon black particles and/or carbon black fibers by:
   (A) Forming, a functional polymer by electropolymerization onto the surface of carbon black selected from at least one of carbon black particles and carbon black fibers by treating a dispersion of said carbon black particles and/or carbon black fibers in a combination of a monomer and solvent by introducing a negatively charged cathode and a positively charged anode to said dispersion with an electrical potential applied across said cathode and anode to cause an electropolymerization of said monomer to form a living polymer (ionic or radical) on the surface of said carbon black particles and/or fibers, wherein said monomer and solvent combination is selected from;
      (1) combination of monomer "X" and solvent selected from acrylic and methacrylic solvents, or
      (2) monomer "Y" and aprotic solvent, followed by
   (B) introducing at least one monomer to the living ends of said functional polymer formed on the surface of said carbon black particles and/or carbon black fibers of step (A) in a solvent and polymerizing said monomer thereon in the presence of an anionic catalyst, and optionally, in the presence of an anionic polymerization randomizing modifier, to form an elastomeric extension to said carbon black particles and/or carbon black fibers, or
   (C) quenching a living, anionic catalysis prepared elastomer by introducing said carbon black particles and/or carbon black fibers of said step (A) to said living polymer, wherein said living polymer is prepared by polymerizing at least one polymerizable monomer in the presence of an anionic catalyst, in the presence of an anionic catalyst modifier, to thereby form an elastomeric extension to said carbon black particles and/or said carbon black fibers, and (D) recovering said modified carbon black;

wherein said solvent for said electropolymerization contains an electrolyte for providing suitable electrical conductivity for the organic solvent for the electric current to effectively flow between said anode and said cathode;

wherein said monomers for said step (B) and step (C) are selected from at least one of
(1) isoprene and 1,3-butadiene, and
(2) a combination of at least one of isoprene and 1,3-butadiene together with styrene;

wherein said combination of monomer "X" and solvent is a combination selected from the group consisting of acrylonitrile/acetonitrile, acrylonitrile/propylene carbonate, acrylonitrile/N,N'-dimethylformamide, acrylonitrile/dimethacrylamide, acrylonitrile/pyridine, ethylacrylatel/N,N'-dimethylformamide, ethylacrylate/pyridine, silyated-2-hydroxyethylmethacrylate/N,N'-dimethylformamide, methylmethacrylate/N,N'-dimethylformamide, glycidylmethacyrlate/N,N'-dimethylformamide, n-butylacrylate/N,N'-dimethylformamide, tert-butylacrylate/N,N'-dimethylformamide, allylmethacrylate/N,N'-dimethylformamide, pyrrole/N,N'-dimethylformamide, thiophene/N,N'-dimethylformamide and vinylpyridine/N,N'-dimethylformamide; and wherein said combination of monomer "Y" and solvent is a combination selected from the group consisting of acrylonitrile/acetonitrile, acrylonitrile/dimethylacetamide, acrylonitrile/N,N'-dimethylformamide, acrylonitrile/pyridine, ethylacrylate/N,N'-dimethylformamide, ethylacrylate/pyridine, trimethylsiloxyethylmethacrylate/N,N'dimethylformamide, methylmethacrylate/N,N'-dimethylformamide, tert-butylacrylate/N,N'-dimethyhlformamide, glycidylmethacrylate/N,N'dimethylformamide, n-butylacrylate/N,N'-dimethylformamide, allylmethacrylate/N,N'-dimethylformamide, pyrrole/N,N'-dimethylformamide, thiophene/N,N'-dimethylformamide and vinylpyridine/N,N'-dimethylformamide.

2. An article of manufacture having at least one component comprised of said rubber composition of claim 1.

3. A tire having at least one component comprised of said rubber composition of claim 1.

4. A tire having a circumferential tread comprised of said rubber composition of claim 1.

5. The rubber composition of claim 1 which comprises;
(A) 100 phr of at least one diene-based elastomer,
(B) about 35 to about 115 phr of at least one reinforcing particulate filler as:
(1) about 30 to about 80 phr of said electropolymerization modified carbon black,
(2) from 5 to about 35 phr of at least one additional particulate reinforcing material selected from carbon black, synthetic amorphous silica and silica treated carbon black having silica domains on its surface and starch/plasticizer composite wherein said silica, silica of said silica treated carbon black and starch/plasticizer composite contain hydroxyl groups (e.g. silanol groups) in its surface, and
(C) a coupling agent for said synthetic amorphous silica, silica treated carbon black and starch/plasticizer composite, wherein said coupling agent contains a moiety reactive with said hydroxyl groups on the surface of said synthetic amorphous silica, silica treated carbon black, and starch/plasticizer and another moiety interactive with at least one of said elastomer(s).

6. The rubber composition of claim 5 wherein said reinforcement material is comprised of said synthetic amorphous silica and carbon black.

7. The rubber composition of claim 5 wherein said reinforcement material is comprised of said synthetic amorphous silica, carbon black and starch/plasticizer composite.

8. The rubber composition of claim 5 wherein said said synthetic amorphous silica is pre-treated with said coupling agent prior to its addition to said rubber composition.

9. The rubber composition of claim 5 wherein said elastomer is a homopolymer or copolymer of isoprene and/or 1,3-butadiene or copolymer of at least one of isoprene and 1,3-butadiene together with styrene.

10. The rubber composition of claim 5 wherein said elastomer is selected from one or more of
(A) end functionalized organic solution polymerized prepared elastomers of isoprene/butadiene copolymers, styrene/butadiene copolymers and styrene/isoprene/butadiene copolymers which are end functionalized with minor amounts of trialkoxysilane, dialkoxymonoalkyl silane, or primary or secondary amines;
(B) tin coupled and/or tin end capped organic solution polymerized elastomers of styrene/butadiene, styrene/isoprene/butadiene and isoprene/butadiene copolymers which have been prepared by the polymerization of styrene, 1,3-butadiene, and optionally isoprene, in the presence of an alkyl lithium catalyst and an organotin compound; and
(C) functionalized aqueous solution polymerization prepared styrene/butadiene copolymer elastomers prepared by copolymerizing styrene and 1,3-butadiene monomers with minor amounts of hydroxypropylmethacrylate (HPMA), acrylonitrile (ACN) or vinylpyridine.

11. An article of manufacture is provided having at least one component comprised of said rubber composition of claim 5.

12. The composition of claim 1 wherein said electrolyte is tetraethyl ammonium perchlorate.

\* \* \* \* \*